US012686547B2

(12) United States Patent
Wasylyk

(10) Patent No.: US 12,686,547 B2
(45) Date of Patent: Jul. 21, 2026

(54) PAPERBOARD BLISTER PACK AND MANUFACTURING METHOD

(71) Applicant: ATLANTIC COAST CREATIONS, LTD., Central Falls, RI (US)

(72) Inventor: Frank H. Wasylyk, Central Falls, RI (US)

(73) Assignee: ATLANTIC COAST CREATIONS, LTD.

( * ) Notice: Subject to any disclaimer, the term of this patent is extended or adjusted under 35 U.S.C. 154(b) by 0 days.

(21) Appl. No.: 18/735,081

(22) Filed: Jun. 5, 2024

(65) Prior Publication Data

US 2024/0409290 A1 Dec. 12, 2024

Related U.S. Application Data

(60) Provisional application No. 63/506,562, filed on Jun. 6, 2023.

(51) Int. Cl.
*B65D 75/36* (2006.01)
*B31B 50/26* (2017.01)
(Continued)

(52) U.S. Cl.
CPC .......... *B65D 75/366* (2013.01); *B31B 50/262* (2017.08); *B31B 50/624* (2017.08);
(Continued)

(58) Field of Classification Search
CPC .... B65D 5/4208; B65D 75/30; B65D 75/366; B65D 75/566; B31B 50/262; B31B 50/44;
(Continued)

(56) References Cited

U.S. PATENT DOCUMENTS 3,756,495 A * 9/1973 Bemiss .................. B65D 5/563 229/162.1
4,114,797 A 9/1978 Manizza
(Continued)

FOREIGN PATENT DOCUMENTS

GB 2532117 A 5/2016
GB 2543922 B 8/2019
WO 2023283491 A1 1/2023

OTHER PUBLICATIONS

International Search Report and Written Opinion received for PCT Application No. PCT/US2024/032657 mailed on Sep. 18, 2024, 10 pages.

(Continued)

*Primary Examiner* — Luan K Bui
(74) *Attorney, Agent, or Firm* — Adler Pollock & Sheehan P.C.

(57) ABSTRACT

A package for containing a product includes a face card and a tray sealed to a rear surface of the face card, The tray includes a rectangular bottom portion, opposing side walls extending from respective sides of the bottom portion, first and second side flanges extending from outer edges of the side walls, and opposing end walls extending from respective ends of the bottom portion. In this tray, each end wall is configured with opposing lateral edges and opposing corner flaps extending from those lateral edges. First and second end flanges extend from outer edges of the end walls and are adhered to respective side flanges. The corner flaps are adhered to respective surfaces of the opposing side walls.

9 Claims, 8 Drawing Sheets

(51) Int. Cl.

| | |
|---|---|
| ***B31B 50/62*** | (2017.01) |
| ***B65D 75/56*** | (2006.01) |
| *B31B 100/00* | (2017.01) |
| *B31B 110/10* | (2017.01) |
| *B31B 110/35* | (2017.01) |

(52) U.S. Cl.
CPC ........ *B65D 75/566* (2013.01); *B31B 2100/00* (2017.08); *B31B 2110/10* (2017.08); *B31B 2110/35* (2017.08)

(58) Field of Classification Search
CPC .................. B31B 50/46; B31B 50/741; B31B 2100/0024; B31B 2120/002
USPC ......................... 206/461, 466, 470, 471, 806
See application file for complete search history.

(56) References Cited

U.S. PATENT DOCUMENTS

| | | | | |
|---|---|---|---|---|
| 4,257,530 | A * | 3/1981 | Faller | B65B 9/04 229/905 |
| 6,053,321 | A * | 4/2000 | Kayser | B65D 73/0057 206/63.5 |
| 6,739,453 | B1 * | 5/2004 | Mazurek | B65D 5/54 206/806 |
| 6,818,269 | B2 | 11/2004 | Quinn et al. | |
| 7,621,400 | B2 | 11/2009 | Smith et al. | |
| 7,931,147 | B2 | 4/2011 | Petrelli et al. | |
| 8,100,262 | B2 | 1/2012 | Jones | |
| 8,146,745 | B2 | 4/2012 | Burress et al. | |
| 8,939,350 | B2 | 1/2015 | Valencia | |
| 9,334,095 | B2 | 5/2016 | Mattiucci | |
| 9,487,338 | B2 | 11/2016 | Hammond et al. | |
| 9,586,742 | B2 | 3/2017 | Zacherle et al. | |
| 9,717,650 | B2 | 8/2017 | Johnston et al. | |
| 9,931,273 | B2 | 4/2018 | Hammond et al. | |
| 10,058,479 | B2 | 8/2018 | O'Dwyer et al. | |
| 10,080,702 | B2 | 9/2018 | Hammond et al. | |
| 10,179,090 | B2 | 1/2019 | Hammond et al. | |
| 10,543,950 | B2 | 1/2020 | Hammond et al. | |
| 10,759,580 | B2 | 9/2020 | Davis et al. | |
| 2002/0189964 | A1 | 12/2002 | Mazurek | |
| 2016/0120748 | A1 | 5/2016 | Hammond et al. | |
| 2018/0265270 | A1 | 9/2018 | Mcclaughry | |
| 2021/0053714 | A1 * | 2/2021 | Zwaga | B65D 77/2024 |
| 2023/0382621 | A1 * | 11/2023 | Schultz | B65D 75/522 |

OTHER PUBLICATIONS

Automationworld, "All-Paper Blister Pack Debuts at Pack Expo", Retrieved Online Via <https://www.automationworld.com/home/article/21735039/allpaper-blister-pack-debuts-at-pack-expo> date unknown, 8 pages.

Sonoco, "All-Paper Blister Package From: Sonoco", Packaging World, Retrieved Online via <https://www.packworld.com/design/package-design/product/21117748/sonoco-allpaper-blister-package> date unknown, 18 pages.

Westrock, "Natralock", date unknown, 2 pages.

* cited by examiner

PAPERBOARD BLISTER PACK AND MANUFACTURING METHOD

CROSS-REFERENCE TO RELATED APPLICATIONS

This application claims benefit of priority of U.S. Provisional Application No. 63/506,562, filed Jun. 6, 2023, and entitled "Paper Board Blister Pack With Closed Corners And Manufacturing Method," which is incorporated by reference in its entirety.

BACKGROUND

Field

The present disclosure pertains to the field of packaging, specifically to the packaging trays with enhanced structural integrity and improved handling during the packaging process.

Description of the Problem

Blister packs are a type of packaging commonly used to contain and protect products. They are made by forming a cavity or pocket from a formable web, usually a thermoformed plastic, which is then sealed to a backing material such as paperboard.

The use of plastic materials can be a concern for environmental sustainability. Efforts are being made to develop recyclable and biodegradable blister pack materials. Blister packaging can be more expensive than other types of packaging due to the materials and manufacturing processes involved.

Paperboard blister packs offer several advantages compared to plastic blister packs, particularly in terms of environmental impact and consumer appeal. Paperboard is made from wood pulp, a renewable resource, making it more sustainable than petroleum-based plastics. Paperboard is biodegradable, which means it breaks down more easily in the environment, reducing long-term waste. Paperboard is widely recyclable, and many recycling facilities accept it, making it easier to recycle than some types of plastic.

However, paperboard blister packs may suffer by comparison in terms of structural strength. Paperboard is less durable than plastic, and it can tear or crush more easily during handling and transportation, potentially damaging the product inside.

Designing and manufacturing blister packs with paperboard components can be more complex and may require specialized machinery and techniques. Additionally, achieving a strong and consistent seal between the paperboard and the blister can be challenging, which might lead to issues with tamper evidence and product protection. Using reinforced paperboard or incorporating additional structural elements can improve the strength and resilience of the packaging. Further, designing the blister pack with reinforced edges and corners can help improve its overall strength and prevent tearing or crushing.

SUMMARY

For purposes of summary, certain aspects, advantages, and novel features are described herein. It is to be understood that not necessarily all such advantages may be achieved in accordance with any one particular embodiment. Thus, the apparatuses or methods claimed may be embodied or carried out in a manner that achieves or optimizes one advantage or group of advantages as taught herein without necessarily achieving other advantages as may be taught or suggested herein.

In one aspect, a package for containing a product includes a face card and a tray sealed to a rear surface of the face card, The tray includes a rectangular bottom portion, opposing side walls extending from respective sides of the bottom portion, first and second side flanges extending from outer edges of the side walls, and opposing end walls extending from respective ends of the bottom portion. In this tray, each end wall is configured with opposing lateral edges and opposing corner flaps extending from those lateral edges. First and second end flanges extend from outer edges of the end walls and are adhered to respective side flanges. The corner flaps are adhered to respective surfaces of the opposing side walls.

In one embodiment, the tray defines a rectangular prism, while in another embodiment, the tray defines a truncated pyramid. In yet another embodiment, where the tray is a truncated pyramid, the corners of the tray deviate from perpendicular by 20 degrees, 15 degrees, or 10 degrees.

Another feature disclosed herein is a method for forming packaging tray where the tray comprises the elements described above. The method may comprise the steps of folding tray end walls toward the tray interior, folding end flanges away from the tray interior, and then folding the corner flaps toward the tray interior. Next, the side walls are folded toward the interior and the side flanges are folded away from the tray interior. Lastly, the corner flaps are adhered to respective side walls while the end flanges are adhered to respective side flanges.

BRIEF DESCRIPTION OF THE DRAWINGS

The disclosed apparatus and method are described with reference to the accompanying drawings. In the drawings, like reference numbers indicate identical or functionally similar elements. Additionally, the left-most digit(s) of a reference number identifies the drawing in which the reference number first appears.

FIG. 6A is a top plan view of the tray and 6B is a bottom plan view.

DETAILED DESCRIPTION

The various embodiments of the paper board blister pack and method, and their advantages, are best understood by referring to FIGS. 1 through 7 of the drawings. The elements of the drawings are not necessarily to scale, emphasis instead being placed upon clearly illustrating the novel features and principles of operation. Throughout the drawings, like numerals are used for like and corresponding parts of the various drawings.

Furthermore, reference in the specification to "an embodiment," "one embodiment," "various embodiments," or any variant thereof means that a particular feature or aspect described in conjunction with the particular embodiment is included in at least one embodiment. Thus, the appearance of the phrases "in one embodiment," "in another embodiment," or variations thereof in various places throughout the specification are not necessarily all referring to its respective embodiment.

The term "fold line" as used herein may refer to a fold line, a score line, an ablated channel or multiple parallel fold lines, score lines or ablated channels in close proximity so as to function as a fold line.

Figure 1:
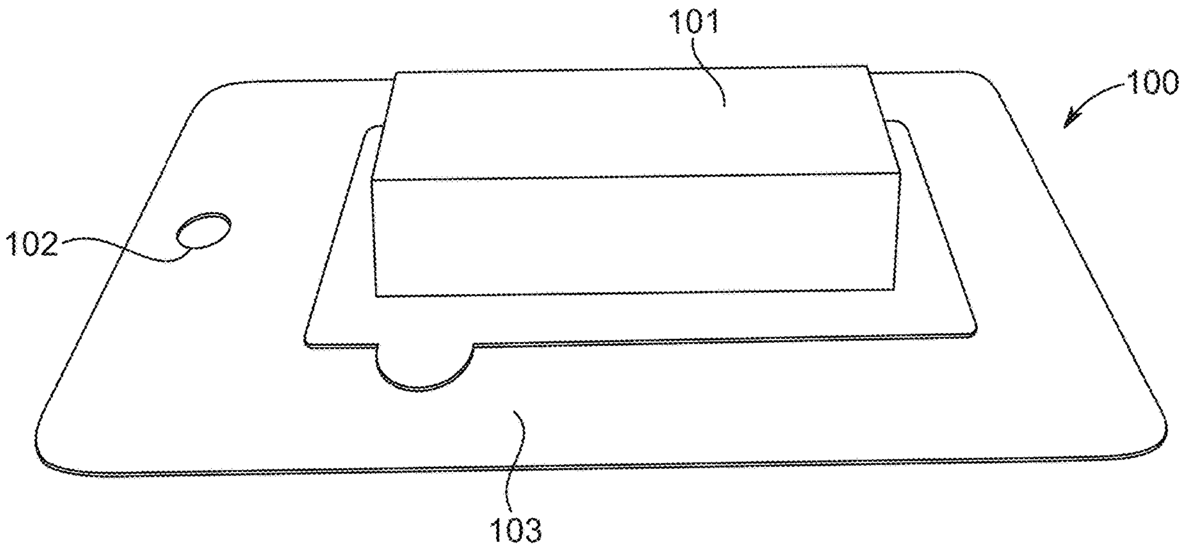
FIG. 1 is an exemplary blister pack.
Figure 2A:
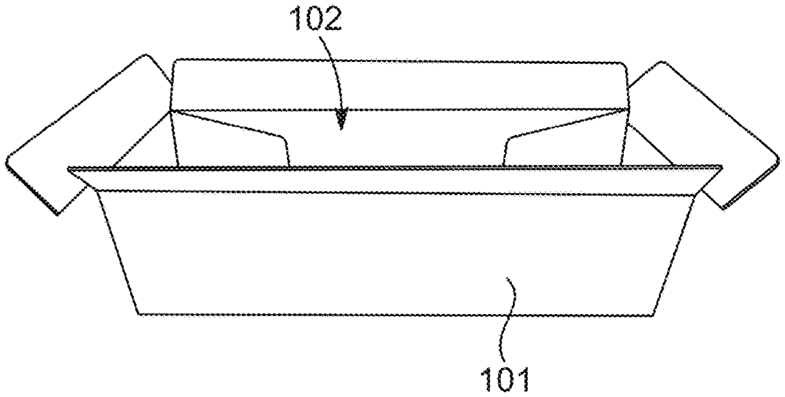
FIG. 2A is an exemplary tray for a blister pack.
Figure 2B:
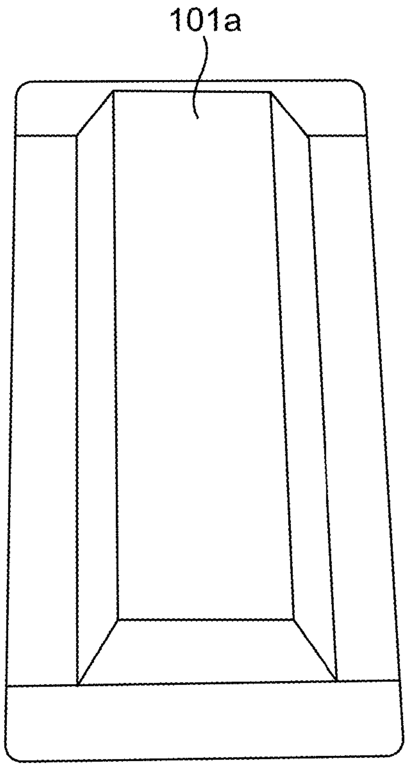
FIG. 2B depicts three exemplary versions of the tray of FIG. 2A.

Referring first to FIG. 1, package 100 comprises a flat face card 103 sealed to tray 101. Face card 103 may include a small hole 102 defined therein and located near the top of package 100 for accommodating a rod or hook for retail display purposes. Tray 101 may be a rectangular prism as seen in FIG. 1. FIGS. 2A & B depict various embodiments of tray 101. Alternatively, tray 101 may define a truncated pyramid as shown in FIGS. 2A & 2B. FIG. 2B shows three versions of tray 101, specifically, a 20° version 101*a*, wherein the corners deviate from perpendicular by roughly 20°, a 15° version 101*b*, and a 10° version 101*c*. It will be understood that tray 101 may be configured such that the corners define any suitable angle depending on the product intended to be contained within tray 101. When formed, tray 101 defines a cavity 102 within which a product (not shown) may be contained.

Figure 3:
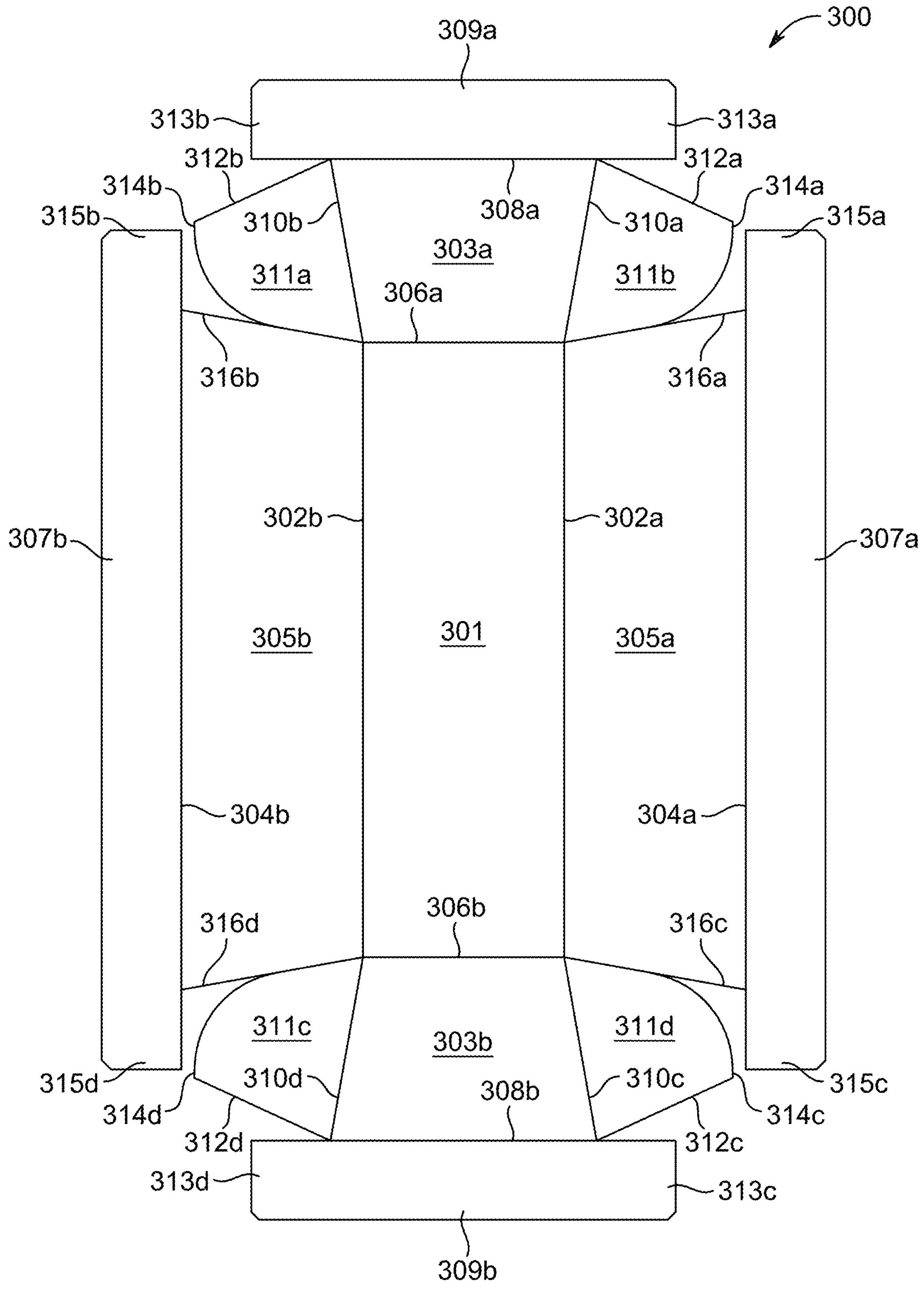
FIG. 3 is an exemplary tray blank.

FIG. 3 is a top plan view of a tray blank 300 used to make tray 100. Tray blank 300 comprises a tray bottom 301, two opposing tray side walls 305*a, b* and two opposing tray end walls 303*a, b*. Tray blank 300 also comprises two opposing side flanges 307*a, b* and two opposing end flanges 309*a, b*. Tray bottom 301 may be rectangular and may have a periphery comprising two opposing parallel side fold lines 302*a, b* and two opposing parallel end fold lines 306*a, b*. Tray side walls 305*a, b* are attached to tray bottom 301 along the side fold lines 302*a, b* and terminate in side wall free edges 316*a-d*. Tray end walls 303*a, b* are attached to tray bottom 301 along the end fold lines 306*a, b*. Each tray side wall 305*a, b* extends outwardly from tray bottom 301 to a side flange fold line 304*a, b*, and each tray end wall 303*a, b* extends outwardly from tray bottom 301 to an end flange fold line 308*a, b*. As in the previous embodiment, the side fold lines 302*a, b*, end fold lines 306*a, b*, side flange fold lines 304*a, b* and end flange fold lines 308*a, b* may be shallow channels formed into the three-dimensional tray 101.

Side flanges 307*a, b* extend alongside flange fold lines 304*a, b* and comprise side flange tabs 315*a-d* that extend beyond the edges of side walls 305*a, b*. Similarly, end flanges 309*a, b* extend along end flange fold lines 308*a, b* and comprise tabs 313*a-d* that extend beyond corner flap fold lines 310*a-d*. The respective sides of the end walls 303*a, b* comprise corner flap fold lines 310*a-d* that demarcate between end walls 303*a, b* and corner flaps 311*a-d*. Each corner flap 311*a-d* includes an angled free edge 312*a-d* traversing from the ends of end flange fold lines 308*a-b* angling away from end flange 309*a, b*. Angled free edge 312*a-d* transitions or an arcuate free edge 314*a-d*.

Figure 4:
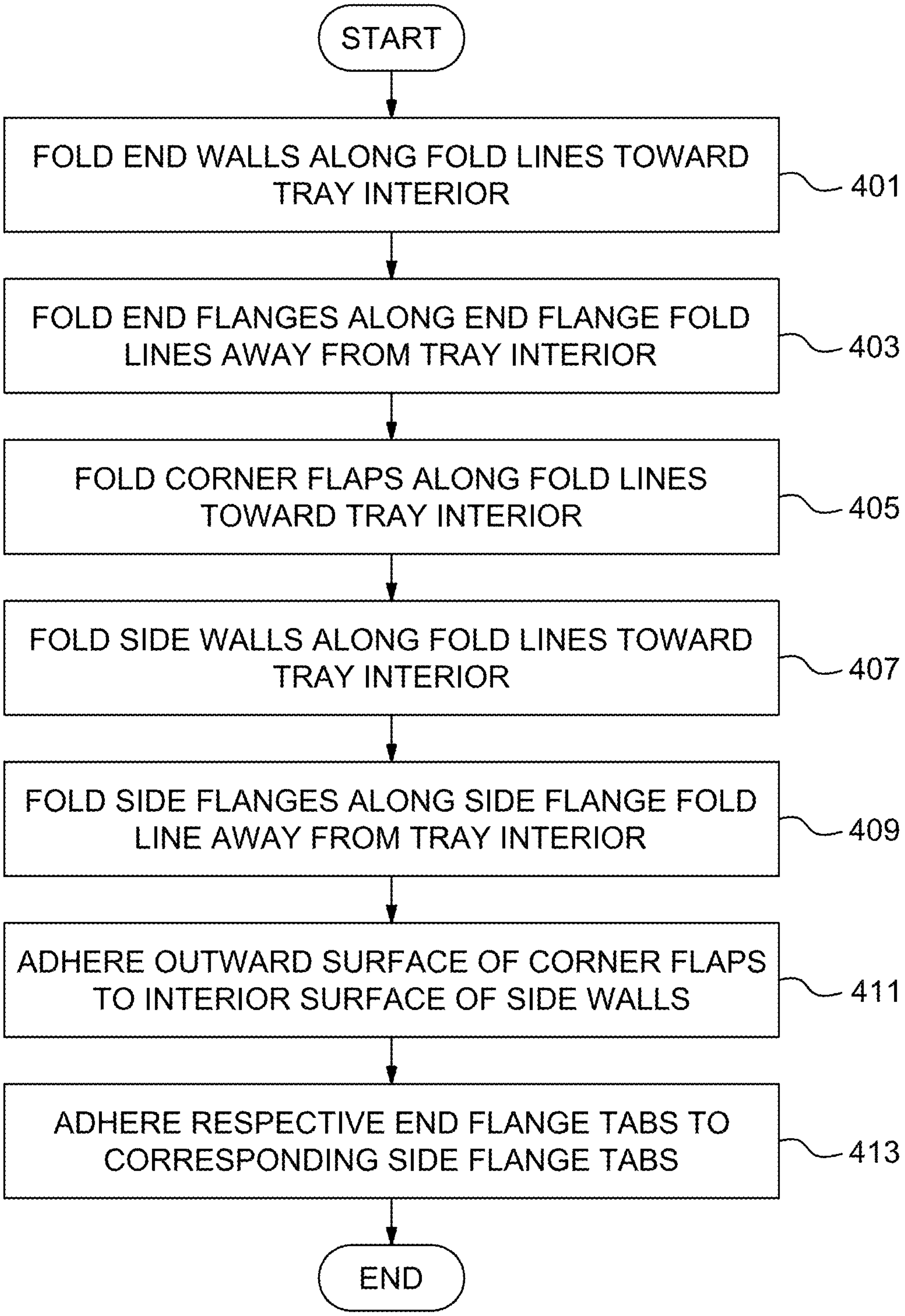
FIG. 4 is a flow chart depicting and exemplary method for forming the tray.

Referring to FIG. 4, tray 100 may be formed, tray blank 300 held in parallel then at Step 401, end walls 303*a, b* are urged out of plane with respect to tray bottom 301, folded along end wall fold lines 306*a, b* until they reach the desired angle with respect to tray bottom 301. At step 403, end flanges are folded along end flange fold lines 308*a, b* away from tray interior. End walls 303*a, b* are held in place while corner flaps 311*a-d* are urged out of plane with respect to end walls 303*a, b* toward the interior of tray 100, folded along corner flap fold lines 310*a-d* (Step 405). Next, at Step 407, side walls 305*a, b* are urged out of plane with respect to tray bottom 301 toward the interior, folded alongside wall fold line 302*a, b*. Side flanges 307*a, b* are urged outward alongside flange fold lines 304*a, b* at Step 409. The outer surfaces of corner flaps 311*a-d* are adhered to the interior surfaces of side walls 305*a, b* such that a truncated pyramid is formed with closed corners at Step 411. At Step 413 respective end flange tabs 313*a-d* are adhered to corresponding side flange tabs 315*a-d.*

It will be appreciated having corner flaps that are adhered to the interior side walls provides better strength and alignment to the paper blister flange corners. Second, when a stack of these paper blister assemblies is loaded into a feeding magazine on a typical heat seal machine, they will have a good feed rate without misfeeds/or nonfeed/or double feed of the paper blister assembly.

FIGS. 5A through 5F illustrate an exemplary forming apparatus 500 for forming tray 100. Forming block 501 is configured with a die in the shape of a truncated pyramid. Prior to the forming process, tray blank 300 may be coated with a heat-activated adhesive during a printing process. Adhesive (not shown) may be applied to the exterior surfaces of corner flaps 311*a-d* and to end flange tabs 313*a-d* and/or side flange tabs 315*a-d.*

Figure 5B:
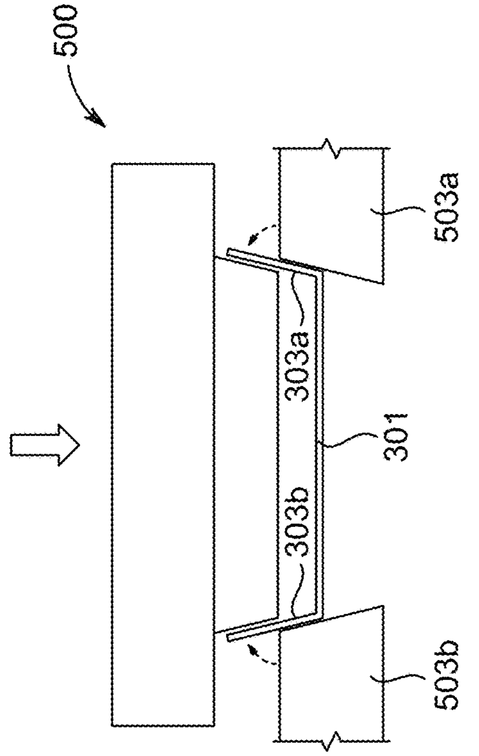
FIGS. 5A through 5F illustrate an exemplary apparatus for forming a tray.
Figure 5C:
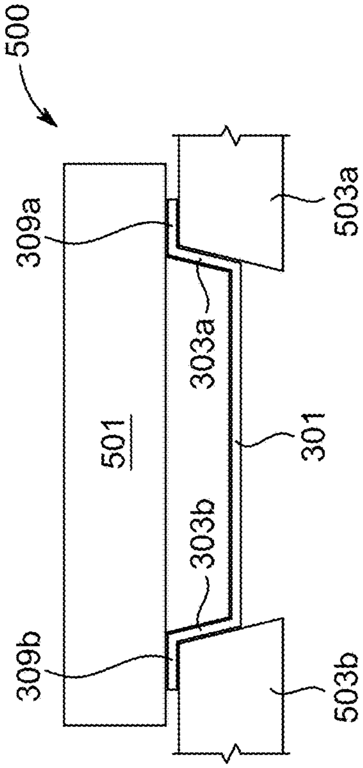
Figure 5A:
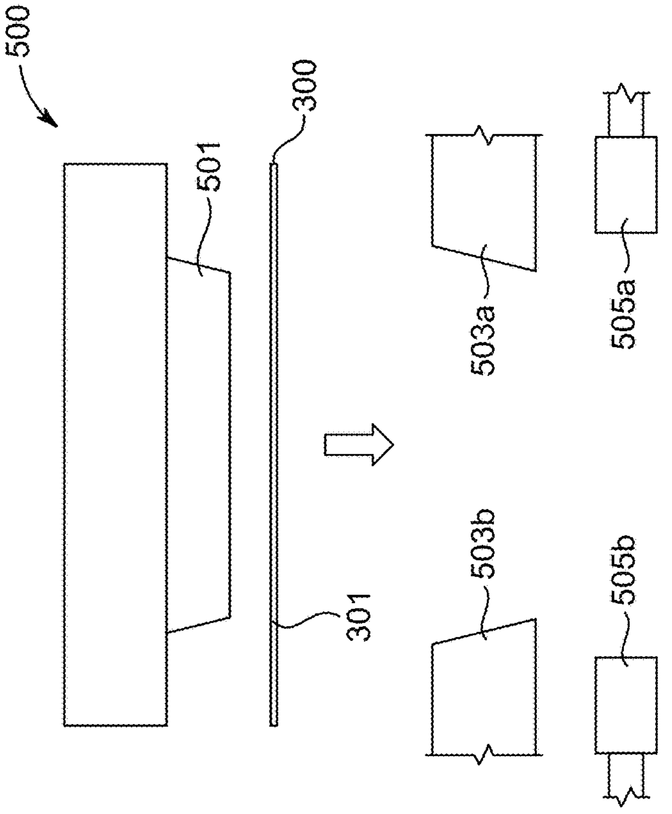
Figure 5F:
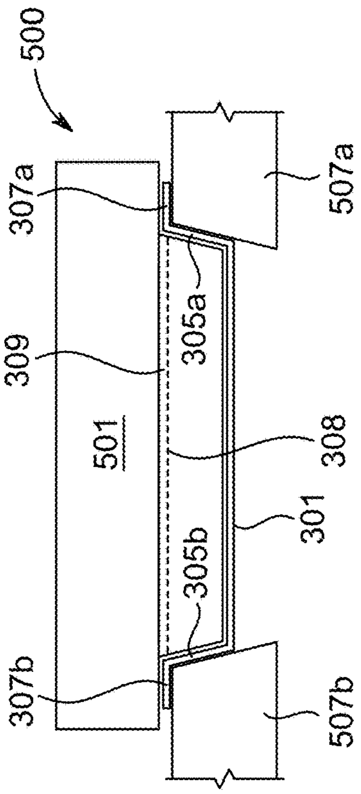
Figure 5D:
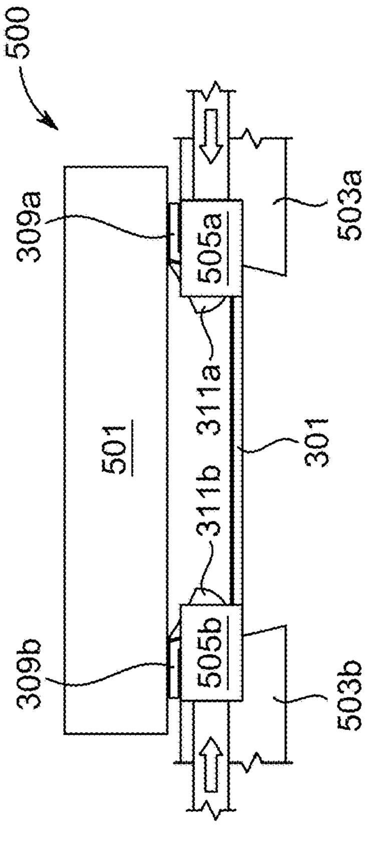

Then, in the forming process, tray blank 300 is held horizontally with tray bottom 301 against the die. The apparatus further comprises a pair of end wall blocks 503*a, b* and arms 505*a, b*. Forming block 501 travels downward pressing tray blank 300 into the end wall blocks 503*a, b* which urges the end walls 303*a, b* upward away from tray bottom 301 (FIG. 5B). Forming block 501 seats tray blank 300 against end wall blocks 503*a, b* which then forces end flanges 309*a, b* against the under surface of forming block 501, as shown in FIG. 5C, fold end flanges 309*a, b* outward. In FIG. 5D, corner flaps 311*a, c* may be folded inwardly by inward movement of arms 505*a, b*. Note that an opposing pair of arms 505 will be on the opposite side of the apparatus to fold the remaining corner flaps 311*b, d.*

Figure 5E:
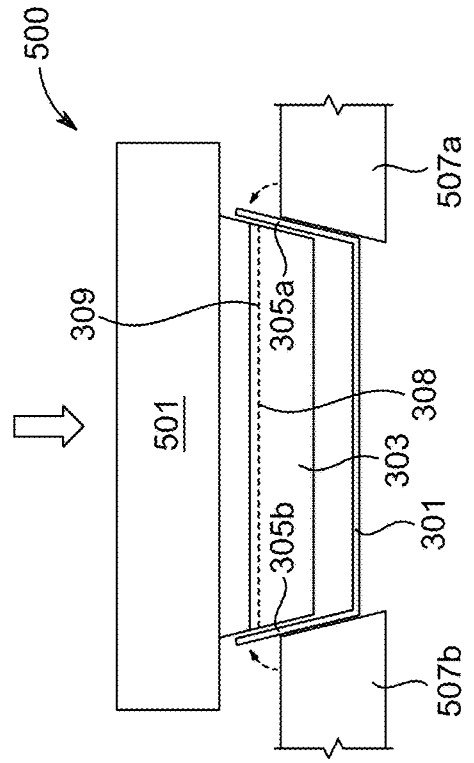

FIG. 5E is a view of the apparatus in an end-on view illustrating end wall 303 up against the die. In this illustration, forming block 501 has traveled further downward pressing tray blank 300 against side wall blocks 507*a, b* which urges side walls 305*a, b* upward. In FIG. 5F, downward motion of forming block 501 has seated tray blank 300 against side wall blocks 507*a, b* forcing side flanges 307*a, b* against the under surface of forming block 501, thus folding side flanges 307*a, b* outward. Corner flaps 311 outer surfaces are adhered to the interior surfaces of side walls 305 and end flange tabs 313*a-d* are adhered to respective side flange tabs 315*a-d*. The truncated pyramid is pressed on the sides and heated to activate the adhesive on the corner flaps 311 and pressed on the top and heated to activate the adhesive on the tabs 313, 315.

Figure 6A:
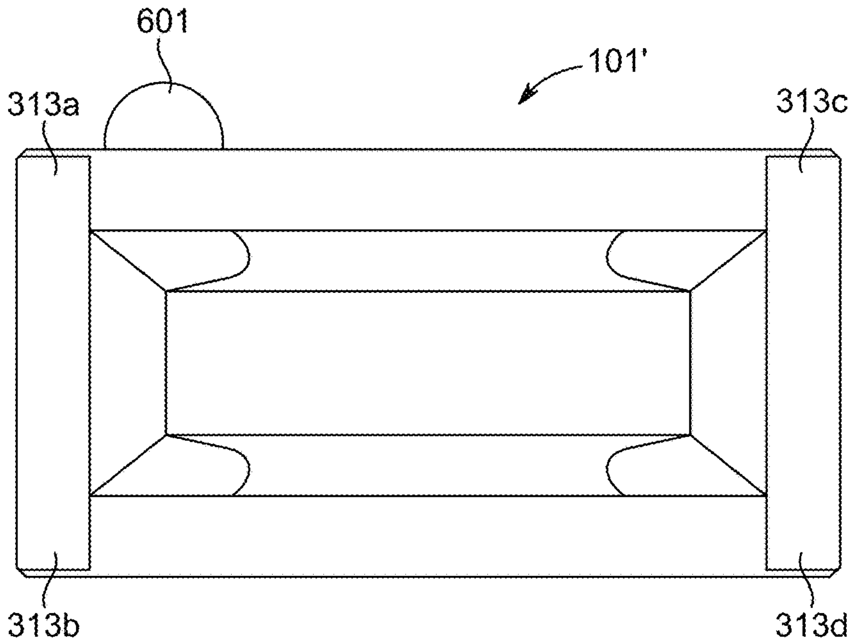
FIGS. 6A&B show another embodiment of the paper tray where
Figure 6B:
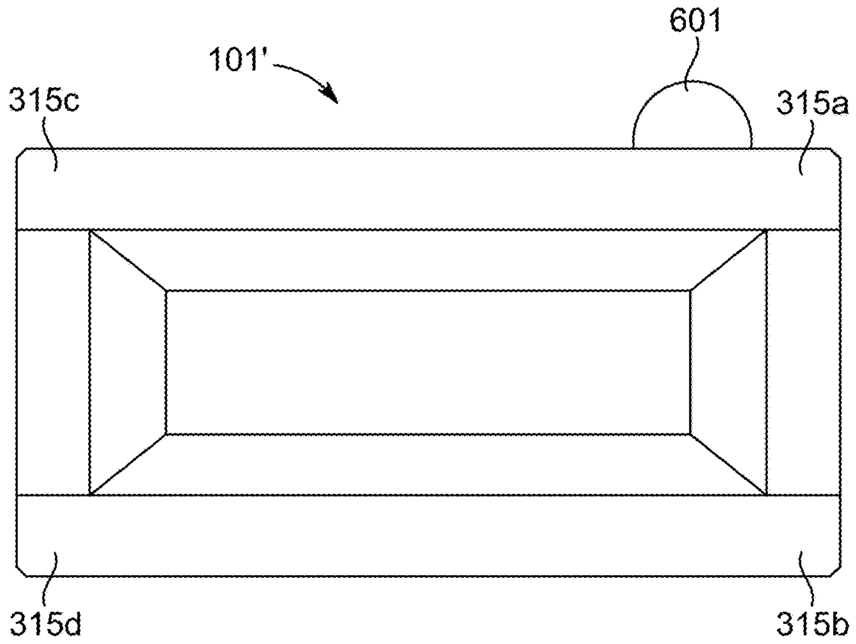
Figure 7:
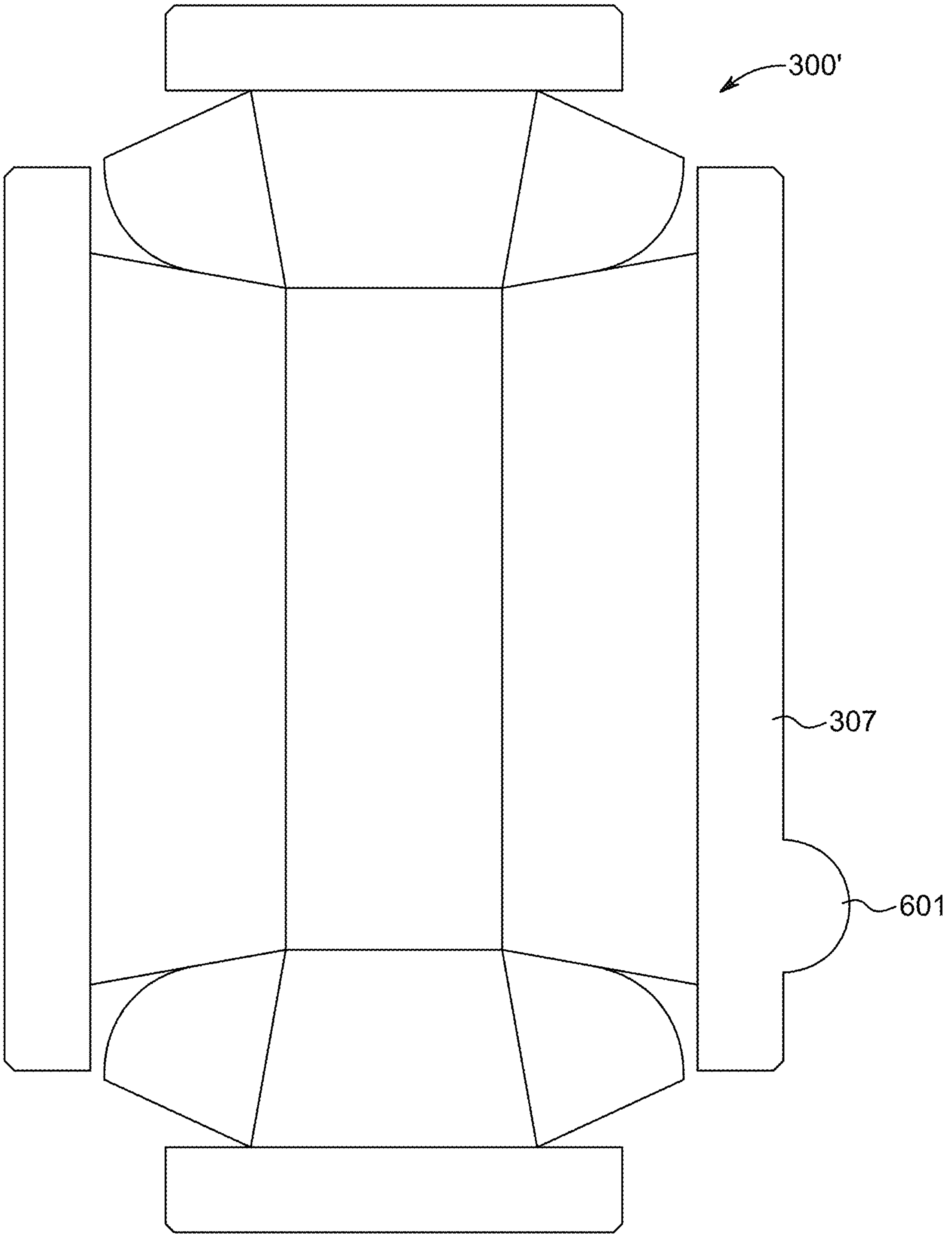
FIG. 7 is a plan view of an exemplary tray blank for the embodiment of FIGS. 6A&B.

FIGS. 6A&B are photographs of another embodiment of a tray 101' in which a pull tab 601 extends outward from a side flange. These photos illustrate the overlapping tabs 313*a-d* & 315*a-d*. FIG. 7 is a drawing of tray blank 300' for the tray 101' of FIGS. 6A&B. Pull tab 601 can be seen extending from an outward edge of one of the side flanges 307.

As described above and shown in the associated drawings, the present invention comprises a paper board blister pack with closed corners and manufacturing method. While particular embodiments have been described, it will be understood, however, that any invention appertaining to the apparatus/system/method described is not limited thereto, since modifications may be made by those skilled in the art, particularly in light of the foregoing teachings. It is, therefore, contemplated by the appended claims to cover any such modifications that incorporate those features or those improvements that embody the spirit and scope of the invention.

What is claimed is:

1. A package for containing a product, the package comprising:
- a face card; and
- a tray sealed to a rear surface of the face card, the tray comprising:
  - a rectangular bottom portion;
  - opposing side walls extending from respective sides of the bottom portion;
  - first and second side flanges extending from outer edges of the side walls;
  - opposing end walls extending from respective ends of the bottom portion wherein a pull tab extending outward from one of the first and second side flanges,
  - wherein each end wall includes opposing corner flaps extending from lateral edges of the end wall,
  - each corner flap comprising an angled free edge and an arcuate free edge and being folded inward toward an interior of the tray and adhered to an inner surface of a respective side wall,
  - the adhered corner flaps overlapping the respective side walls to resist separation of the side walls from the end walls during handling; and
  - first and second end flanges extending from the outward edges of the end walls and adhered to respective side flanges.

2. The package of claim 1, wherein the tray defines a rectangular prism.

3. The package of claim 1, wherein the tray defines a truncated pyramid.

4. The package of claim 3, wherein the corners of the tray deviate from perpendicular by 20 degrees, 15 degrees, or 10 degrees.

5. A method for forming a product package, the product package comprising a tray, the tray comprising a rectangular bottom portion, opposing side walls extending from respective sides of the bottom portion, first and second side flanges extending from outer edges of the side walls, opposing end walls extending from respective ends of the bottom portion, wherein a pull tab extending outward from one of the first and second side flanges, wherein each end wall includes opposing corner flaps extending from lateral edges of the end wall, each corner flap comprising an angled free edge and an arcuate free edge and being folded inward toward an interior of the tray and adhered to an inner surface of a respective side wall, the adhered corner flaps overlapping the respective side walls to resist separation of the side walls from the end walls during handling, and first and second end flanges extending from outer edges of the end walls, the tray having an interior, the method comprising the steps of:
- folding tray end walls toward the interior;
- folding end flanges away from the interior;
- folding corner flaps toward the interior;
- folding side walls toward the interior;
- folding side flanges away from the interior;
- adhering corner flaps to respective side walls.

6. The method of claim 5, wherein the adhering steps are performing by heat sealing.

7. The method of claim 5, wherein the tray defines a rectangular prism.

8. The method of claim 5, wherein the tray defines a truncated pyramid.

9. The method of claim 8, wherein the corners of the tray deviate from perpendicular by 20 degrees, 15 degrees, or 10 degrees.

* * * * *